United States Patent Office 3,783,106
Patented Jan. 1, 1974

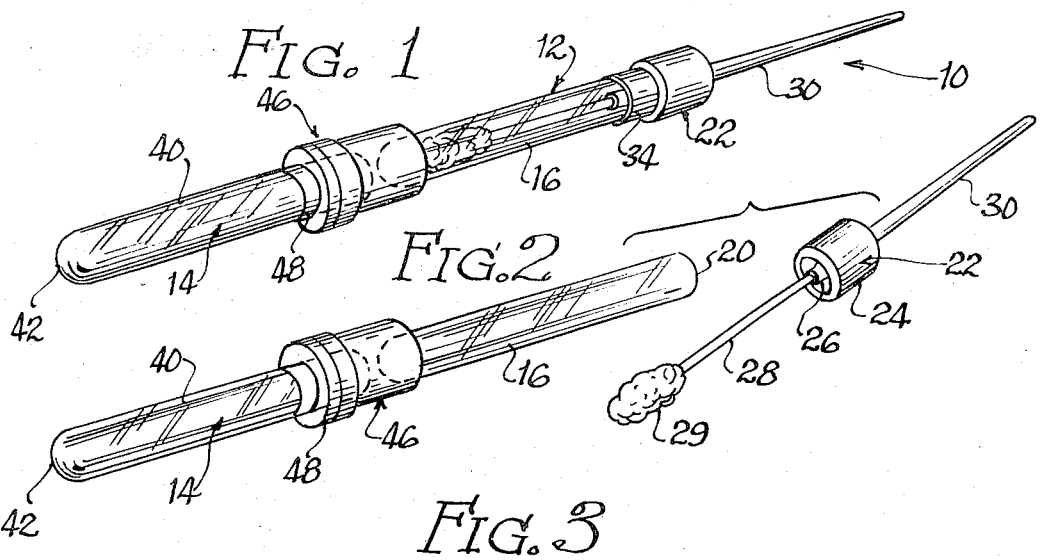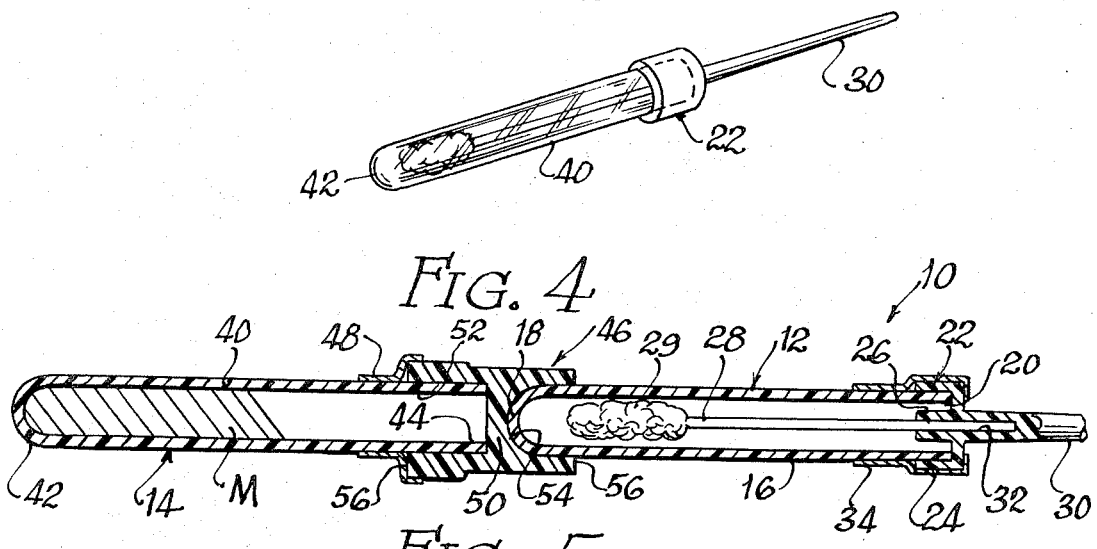

---

3,783,106
TESTING AND CULTURING TRANSPORT SYSTEM
Jack R. Henshilwood, Highland, Ind., assignor to Wilson Pharmaceutical & Chemical Corporation
Filed May 15, 1972, Ser. No. 253,353
Int. Cl. C12k 1/10
U.S. Cl. 195—139    4 Claims

ABSTRACT OF THE DISCLOSURE

A testing and culturing transport system having coaxial first and second elongate tubes each defining a closed end and an open end, the closed end of the first tube and the open end of said second tube being in a closely adjacent end-to-end relation. The first tube mounts a cap bearing a swab and sealingly closes the first open end and the second tube contains a culture medium. Releasable securing means secures the tubes together and comprises a molded elongate plastic member defining a pair of coaxial bores each of which terminates inwardly of the plastic member in a solid wall. One of the bores is proportioned to receive and retain the closed end of said first tube and the second of the bores is proportioned sealingly to close the open end of the said second tube.

---

This invention relates to a testing system for use in collecting, culturing and transporting microorganisms, such as bacteria, and to a method of making such a system. More particularly, it relates to an easily used swabbing unit for collecting a culture from a selected area of a body and for maintaining the culture in a viable condition, for example, during shipment to a test center for subsequent testing and identification. The testing and culturing transport system of this invention provides both a sterile culturing medium and a sterile swabbing member in connected separable compartments. The swabbing member may be removed for use from its compartment, and after use it may be easily sealed in the compartment carrying the culturing medium. The compartments may then be separated, the compartment in which the swabbing member was contained being disposed of, and the remaining compartment with the swabbing member in the culture medium may be easily transported to a test center.

A variety of culturing transport systems have been suggested for use in the past. One such device which is illustrated in U.S. Pat. No. 3,450,129, comprises a complex assembly including a frangible ampoule filled with liquid which is held in the tube bottom, as by a cotton plug. After a culture is taken, the ampoule is ruptured, the culturing medium in the ruptured ampoule moistens the swab, and the tube is closed for shipment, as to a testing laboratory. In such devices, among other things, broken glass may be introduced into the swab head and the system is complicated to manufacture and assemble. Another type of transport system is illustrated in U.S. Pat. No. 3,163,160. In that patent, separate compartments are provided for a swab, and a culture medium which is isolated in a flexible and permanently deformable lower compartment. The compartment must be protected prior to use to prevent the swab from coming into contact with the culture medium prior to its use. Such a construction requires a number of separate parts of various materials, and must be provided with a rigid guard to prevent accidental flexing or deformation of the walls of the lower compartment prior to use.

Others have suggested the manufacture of specially configured culture tubes which are formed to provide a plurality of interior compartments, such as two compartments separated by a vertical wall integrally formed with the outer tube wall. Such tubes are expensive to manufacture. The assembly of a culturing transport system in which the culture medium is in one compartment of a multicompartmented tube and a swab is in another requires great care, particularly when it is understood that both the swab and the culture medium, as well as the compartments themselves, must be sterilized. The manufacture of such a system frequently requires the use of gas sterilization procedures entirely, because it is not possible to autoclave or heat sterilize all of the components of the system.

Another system suggested by U.S. application Ser. No. 198,155, owned by the assignee of the present application, provides an easily and inexpensively made and assembled system which is adapted to use components that may be interchangeably secured to each other, for example as the culturing medium used may vary. That system includes a pair of separate elongate tubes secured to each other in end-to-end relation in which the closed ends are disposed in a closely adjacent or abutting end-to-end relation. One of the tubes contains a culture medium and mounts closure means sealingly closing the open end. The other tube mounts a swab member and a closure means for sealingly closing the open end of that tube. The tubes may each be separately assembled and sterilized in accordance with the most expeditious and efficient mode of sterilization, after which they are ready to be secured to each other.

In accordance with the present invention an improved testing and culturing transport system is provided and one which requires fewer parts and permits easier assembly than that disclosed in the aforementioned application. The system of the present invention comprises a first and second elongate tube each defining a closed end and an open end, and being coaxially disposed. The closed end of said first tube and the open end of said second tube are in a closely adjacent end-to-end relation. The first tube mounts a closure means sealingly closing said first open end and contains a swab member secured to said closure means; said second tube contains a culture medium. Releasable securing means are provided for releasably securing the tubes in said end-to-end relation and comprises a molded elongate plastic member defining a pair of coaxial bores, each terminating inwardly of said plastic member in a solid wall. One of the bores is proportioned to receive and retain the closed end of said first tube and the other bore is proportioned sealingly to close the open end of said second tube. Desirably, the closure means and one of the ends of the plastic member are interchangeable so that they may each close the open ends of the pair of tubes.

Further objects, features and advantages of this invention will become apparent from the following description and appended drawings, of which:

FIG. 1 is a perspective view of a testing and culturing transport system of this invention;

FIG. 2 is a partial exploded perspective view of the system of FIG. 1;

FIG. 3 is a view similar to FIG. 2, with a closure and swab assembly inserted in a culturing tube;

FIG. 4 is a longitudinal cross-sectional view of the system of FIG. 1; and

FIG. 5 is a longitudinal cross-sectional view of FIG. 3.

Referring now to the drawings, a testing and culturing transport system 10 of this invention comprises a first tube assembly 12 and a coaxial second tube assembly 14. Tube assembly 12 comprises an elongate cylindrical tube 16 which may be made of any suitable material, such as of glass or of a transparent plastic. A suitable transparent plastic is a polycarbonate sold under the trade name Lexan by the General Electric Company. Tube 16 is provided with a closed bottom end 18 and an open end 20.

The open end 20 is proportioned to cooperate with a suitably configured closure means, such as a cap 22. Cap 22 comprises a cylindrical section 24 which is configured to sealingly embrace an upper portion of the tube wall adjacent open end 20. That is best illustrated in FIG. 4. Cap 22 defines a central boss 26 suitably apertured to receive the upper end of a swab member 28. The other end of swab member 28 is wrapped with a suitable swab material 29, such as calcium alginate. To minimize the length of tube 16, a relatively short swab member 28 is provided, but additional effective length may be provided by a cap extension 30 formed integrally with cap 22. To make certain that the cap 22 and swab member 28 are fixedly secured to each other, as illustrated in FIG. 4, a cylindrical opening 32 molded in cap 22 may be provided to receive the end of swab member 28.

Tube assembly 12 is adapted to be gas sterilized. After sterilization, cap 22 is sealingly secured in place and is desirably secured by a tamperproof seal 34. Seal 34 may desirably be a heat-shrinkable band positioned to encircle the cap section 24 and an upper peripheral edge of cap 22, as well as a portion of the wall of tube 16 adjacent cap 22, all as is illustrated in FIGS. 1 and 4. If it is not disturbed, as by removal, cutting, or the like, tamperproof seal 34 serves to assure a user of the system that the tube assembly 12 remains in the condition in which it was shipped, i.e., remains in its sterile condition, and that it may therefore be used with confidence.

Tube assembly 14 comprises a generally cylindrical elongate tube 40 having a closed bottom end 42. The other end of tube 40 is open, as indicated at 44. Open end 44 is proportioned to be closed by an elongate plastic closure-connector member 46.

Member 46 is molded of a suitable plastic, such as Lexan and defines a pair of coaxial bores each of which terminates inwardly of the plastic member in a solid wall 50. One of the bores 52 is shaped and proportioned to sealingly receive and close the open end of tube 40 and to hold the tube. The other coaxial bore 54 is proportioned to receive and retain the closed end 18 of the first tube. Bore 52 may be cylindrical, flat bottomed and open or may be provided with a central depending plug and bore wall to enhance the sealing. Bore 54 may be cylindrical and may terminate in a hemispherical inner end 58. Preferably, where open ends 20 and 44 are identical cap 22 and member 46 interchangeably fit and enclose open end 44.

Tube 40 is partially filled with a transport medium, in this case illustrated as being a generally "solid" slant medium M. Tube 40 may be of any suitable material, such as of a transparent Lexan or glass. It is appropriately filled with a predetermined amount of a desired transport medium M, such as a solid slant, is then fitted with member 46, is sealed, if desired, with a tamperproof seal member 48, like tamperproof seal 34, and is then sterilized, as by autoclaving it at a suitable elevated temperature and pressure, such as at about 120° C. and 15 p.s.i.g. for about 30 minutes.

When a testing and culturing transport system 10 of this invention is to be assembled for shipment to a user, appropriate tube assemblies 12 and 14 are made as described (or selected from storage), and are releasably secured to each other in coaxial and end-to-end relation.

When a testing and culturing transport system of FIG. 1 is to be used, as by a doctor, the tamperproof seal 34 is broken and the cap 22 with the swab member 28 is removed, as illustrated by FIG. 2. A specimen is then procured with the swab member 28 by contacting the swab material 29 with the body area from which the specimen is to be taken. Although its use is not so limited, a testing and culturing transport system constructed in accordance with the preferred embodiment illustrated in the drawings is most effectively used to produce rectal and vaginal specimens.

After the specimen has been procured, the member 46 is removed (after breaking the tamperproof seal 48), and the swab material 29 is inserted into the medium M, and the cap 22 is sealingly secured to the open end 44 of tube 40, as was the member 46. Thereafter, the tube 16 may be discarded. It is to be noted that the ends 56 of the plastic member 46 lie in planes perpendicular to the axes of the bores. This means that, where desired, the member can be stood up with the closed end of the tube in one of the bores permitting the medium to stand in an upright position.

The ready securance and separation of a pair of tube assemblies for the purposes stated is most efficiently accomplished in the manner described. However, substantially all of the advantages of the invention may be obtained when flat bottom tubes, rather than round bottom tubes, are used.

Testing and culturing transport systems made in accordance with this invention are inexpensively and efficiently assembled from a minimum number of parts.

The tubes themselves may be of conventional materials and of conventional shapes, requiring the use of no special molding techniques and no difficultly molded or formed sections or portions. Separate tube assemblies, one housing a swab member and the other containing a culture medium, may be manufactured and may be individually sterilized in the most efficient and least expensive manner. An appropriate swabbing tube assembly may then be associated with an appropriate culturing medium assembly, depending upon the test procedure with which the system is to be used. When a testing and culturing transport system is to be made up for shipment, an appropriate swabbing tube assembly may be then releasably secured to a complementary medium containing assembly, as in the manner described above for shipment for ultimate use, as by doctors or other medical personnel. After use, the swab containing tube assembly may be easily removed and thrown away, unlike, for example, systems in which a specially formed tube defining several compartments is used. No crushed pieces of glass or the like are introduced into the medium to interfere with subsequent test procedures, and no special rubber or flexible parts or protective wall members are required, as was the case with a number of the prior art products.

It will be apparent from the foregoing description of a presently preferred embodiment that modifications may be made in the method and system described without departing from the spirit and scope of this invention.

What is claimed is:

1. A testing and culturing transport system comprising a first elongate tube defining a closed end and an open end, a second elongate tube defining a closed end and an open end, said tubes being coaxially disposed, the closed end of said first tube and the open end of said second tube being in a closely adjacent end-to-end relation, means releasably securing said adjacent ends in said closely adjacent end-to-end relation and for sealingly closing the open end of said second tube, said first tube mounting a closure means sealingly closing said first open end, and a swab member secured to said first closure means, said second tube containing a culture medium, said releasable securing means comprising a molded elongate plastic member defining a pair of coaxial bores, each terminating inwardly of said plastic member in a solid wall, one of said bores being proportioned to receive and retain the closed end of said first tube, the second of said bores being proportioned sealingly to close the open end of said second tube.

2. A testing and culturing transport system in accordance with claim 1 wherein said open ends are substantially identical in configuration and said second bore is proportioned interchangeably to sealingly close each of said open ends.

3. A testing and culturing transport system in accordance with claim 2 wherein the ends of said plastic member lie in planes perpendicular to the axes of said bores.

4. A testing and culturing system in accordance with claim 1 in which the inner end of one of said bores is hemispherical.

References Cited
UNITED STATES PATENTS

| | | | |
|---|---|---|---|
| 3,163,160 | 12/1964 | Cohen | 195—139 |
| 3,450,129 | 6/1969 | Avery et al. | 195—139 |
| 3,308,039 | 3/1967 | Nelson | 195—139 |

A. LOUIS MONACELL, Primary Examiner

R. J. WARDEN, Assistant Examiner

U.S. Cl. X.R.

128—2 W

UNITED STATES PATENT OFFICE
CERTIFICATE OF CORRECTION

Patent No. 3,783,106  Dated January 1, 1974

Inventor(s) Jack R. Henshilwood

It is certified that error appears in the above-identified patent and that said Letters Patent are hereby corrected as shown below:

Column 3, line 50, after "plug" insert -- so that the open end may be firmly seated between the plug --;

Column 4, line 6, "produce" should be -- procure --;

Signed and sealed this 23rd day of April 1974.

(SEAL)
Attest:

EDWARD M. FLETCHER, JR.
Attesting Officer

C. MARSHALL DANN
Commissioner of Patents